US012638681B1

(12) United States Patent
Wang et al.

(10) Patent No.: US 12,638,681 B1
(45) Date of Patent: May 26, 2026

(54) ULTRASONIC HOLOGRAM GENERATION

(71) Applicant: Meta Platforms Technologies, LLC, Menlo Park, CA (US)

(72) Inventors: Youmin Wang, Bellevue, WA (US); Yatong An, Redmond, WA (US); Yuri Toride, Broomfield, CO (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 474 days.

(21) Appl. No.: 18/141,127

(22) Filed: Apr. 28, 2023

Related U.S. Application Data

(60) Provisional application No. 63/429,754, filed on Dec. 2, 2022.

(51) Int. Cl.
| | |
|---|---|
| *G02B 27/01* | (2006.01) |
| *B06B 1/06* | (2006.01) |
| *G03H 3/00* | (2006.01) |

(52) U.S. Cl.
CPC ........ *G02B 27/0172* (2013.01); *B06B 1/0629* (2013.01); *G03H 3/00* (2013.01); *G02B 2027/0174* (2013.01); *G02B 2027/0178* (2013.01)

(58) Field of Classification Search
CPC ........ G02B 27/0172; G02B 2027/0174; G02B 2027/0178; B06B 1/0629; G03H 3/00
USPC ......................................... 359/630
See application file for complete search history.

(56) References Cited

U.S. PATENT DOCUMENTS

| | | |
|---|---|---|
| 9,958,684 B1 | 5/2018 | Robbins |
| 11,405,720 B2 | 8/2022 | Zhao et al. |
| 2022/0167945 A1 | 6/2022 | De Jonge et al. |
| 2024/0127782 A1* | 4/2024 | Gompertz .............. G10K 11/34 |

OTHER PUBLICATIONS

Hartwell P., "These Technologies Help Speed the Adoption of Augmented-Reality Systems," Electronic Design, Nov. 10, 2021, 9 pages.

Kim J., et al., "Holographic Glasses for Virtual Reality," ACM SIGGRAPH 2022 Conference Proceedings, Jul. 2022, No. 33, 9 pages.

Sun S., et al., "MEMS Ultrasonic Transducers for Safe, Low-Power and Portable Eye-Blinking Monitoring," Microsystems & Nanoengineering, Jun. 13, 2022, vol. 8, No. 1, 14 pages.

* cited by examiner

*Primary Examiner* — Bumsuk Won
*Assistant Examiner* — Mitchell T Oestreich
(74) *Attorney, Agent, or Firm* — Greenberg Traurig, LLP

(57) ABSTRACT

Embodiments described include a head mounted display (HMD) including an ultrasound array configured to emit ultrasound signals to dynamically arrange micro-particles into a hologram. The hologram includes an image that is viewable when the micro-particles are illuminated by a light source. In some embodiments, the image included in the hologram is viewable from an eyebox region of a head mounted display.

17 Claims, 6 Drawing Sheets

Phased Array

Other Array Layouts

Distributed Array

ULTRASONIC HOLOGRAM GENERATION

CROSS-REFERENCE TO RELATED APPLICATIONS

This application claims priority to U.S. provisional Application No. 63/429,754 filed Dec. 2, 2022, which is hereby incorporated by reference.

TECHNICAL FIELD

This disclosure relates generally to 3D rendering of holograms, and in particular to 3D ultrasonic rendering of holograms for artificial reality (AR) applications.

BACKGROUND INFORMATION

A hologram is an image of an object or animation displayed in 3D. The image can be seen from different perspectives or angles and sometimes may appear to move or change as the viewer moves in relation to the image. The image may appear realistic and may sometimes appear to be floating freely in space. Current techniques for rendering holograms may include, for example, traditional polarization-based 3D movies or spatial light modulators (SLM) located in front of a viewer's eye to project a hologram.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
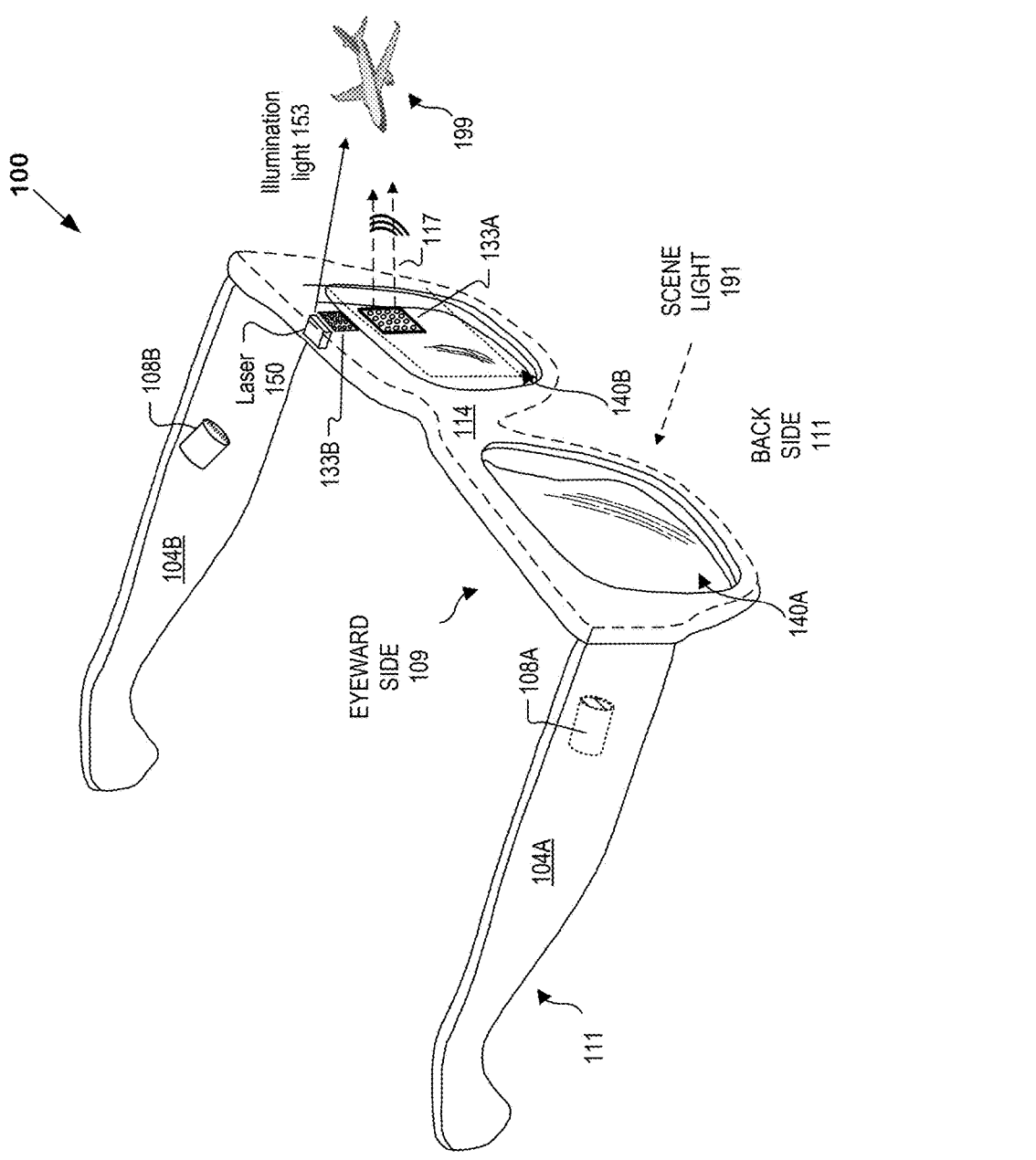
FIG. 1 illustrates a head mounted display (HMD) that includes one or more ultrasound arrays to generate holograms for viewing by an eye, in accordance with aspects of the disclosure.

Embodiments of systems and methods of generating ultrasonic holograms are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.4 µm.

In aspects of this disclosure, the term "transparent" may be defined as having greater than 90% transmission of light. In some aspects, the term "transparent" may be defined as a material having greater than 90% transmission of visible light.

Embodiments of methods and systems for dynamically rearranging micro-particles into a hologram are described herein. In aspects, the hologram may be used for augmented reality (AR) applications.

As noted above, current techniques for rendering holograms may include, for example, methods associated with traditional polarization-based 3D movies or spatial light modulators (SLM) located in front of a viewer's eye. Unfortunately, the techniques may require special glasses for 3D viewing and do not allow different people to view the same hologram at the same time. In addition, the 3D "hologram" has a relatively limited field of view, becoming distorted when viewed from various angles. In the case of the SLM, a hologram generation device located directly in front of the eye may be bulky and cumbersome.

An apparatus, system, and method for ultrasonic hologram generation are described in this disclosure. In implementations, ultrasound arrays are included in micro-electromechanical systems (MEMS) ultrasound devices including transparent materials.

The ultrasound arrays may then be mounted on a transparent substrate, enabling viewing of the hologram with a less cumbersome experience for the viewer. In addition, the field of view is expanded and the 3D image is visible to outside viewers. In examples, ultrasound arrays are configured to emit ultrasound signals to dynamically arrange micro-particles into a hologram that includes the image. Acoustic energy can levitate or move micro-particles of different sizes and materials through mediums, such as, for example, air, water, tissue, or other holographic mediums.

These and other embodiments for generation of the ultrasonic hologram are described in more detail in connection with FIGS. 1-6.

FIG. 1 illustrates an example head mounted display (HMD) that uses ultrasound signals to generate holograms for viewing by an eye of a user of HMD 100, in accordance with aspects of the disclosure. HMD 100 includes one or more arms 111 coupled to a frame 114 that secures one or more lens elements 140A and 140B ("lenses 140") of HMD 100. Arms 111 may secure HMD 100 to the head of a user around the ears, for example. The user may view an external environment through lens 140 which may be transparent or partially transparent. HMD 100 includes one or more ultrasound arrays, e.g., 133A and 133B, as well as a laser or light source 150. In embodiments, ultrasound arrays 133A and 133B may include phased array ultrasound arrays (also referred to as "phased arrays") and may include transparent Piezoelectric Micromachined Ultrasonic Transducers (PMUT).

In the illustrated example, an ultrasound array 133A is disposed on lens 140 to emit ultrasound signal 117 in front of lens 140B to generate hologram 199 viewable by a user. Ultrasound array 133B may also be mounted to frame 114 of HMD 100 to emit an ultrasound signal to generate a hologram. In embodiments, light source 150 is configured to illuminate dynamically arranged micro-particles with the illumination light 153. Note that in FIG. 1, ultrasound array 133A is shown as generating hologram 199 including an example image. In other embodiments ultrasound array 133A and 133B may both contribute to generating hologram 199 or may each generate a separate hologram (e.g., FIG. 3). Note that the airplane of hologram 199 is merely an example of an image and any suitable 3D image as well as a sequence of images forming an animation is contemplated.

HMD 100 may include a display such that HMD 100 is considered augmented-reality (AR) glasses. Implementations of this disclosure may also be implemented in a virtual reality headset, electronic glasses, or nonelectronic eye glasses. Eye-tracking cameras 108A and 108B are shown as coupled to temple arms 104A and 104B, respectively.

In some examples, lens 140A (and/or lens 140B) may appear transparent to the user to facilitate augmented reality or mixed reality such that the user can view visible scene light from the environment while also receiving display light directed to their eye(s) by way of a display layer. Such a display layer may be included in, over, or under lens 140A or 140B and may include a waveguide that is configured to direct virtual images to an eye of a user of HMD 100.

Note that in some embodiments, ultrasound array 133A and 133B may generate holograms primarily for AR applications and in some applications, VR applications of HMD 100 may remain as optional or separate.

Example HMD 100 may also include supporting hardware incorporated into frame 114 and/or temple arms 104A and 104B. The hardware of HMD 100 may include any of processing logic, wired, and/or wireless data interface for sending and receiving data, graphic processors, and one or more memories for storing data and computer executable instructions. In one example, HMD 100 may be configured to receive wired power and/or may be configured to be powered by one or more batteries. In addition, HMD 100 may be configured to receive wired and/or wireless data including video data. In embodiments, the HMD 100 may receive image information to be converted to ultrasound band information for dynamic arrangement of the micro-particles.

As noted above, a display layer underlaying or overlaying an optical layer of lens 140 may include one or more other optical elements depending on the design of the HMD 100. For example, the display layer may include a waveguide to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light. In some embodiments, near-eye optical elements 910 may not include a display and may be included in a head mounted device that is not considered a head mounted display.

Lenses 140A (and/or 140B) may have a lens curvature for focusing light (e.g., scene light 191) to the eye of the user on the eyeward side 109 of lens 140A. In some embodiments, near eye optical element lens 140A and 140B may be prescription lenses. However, in other examples, lens 140A and 140B may be non-prescription lenses.

Figure 2:
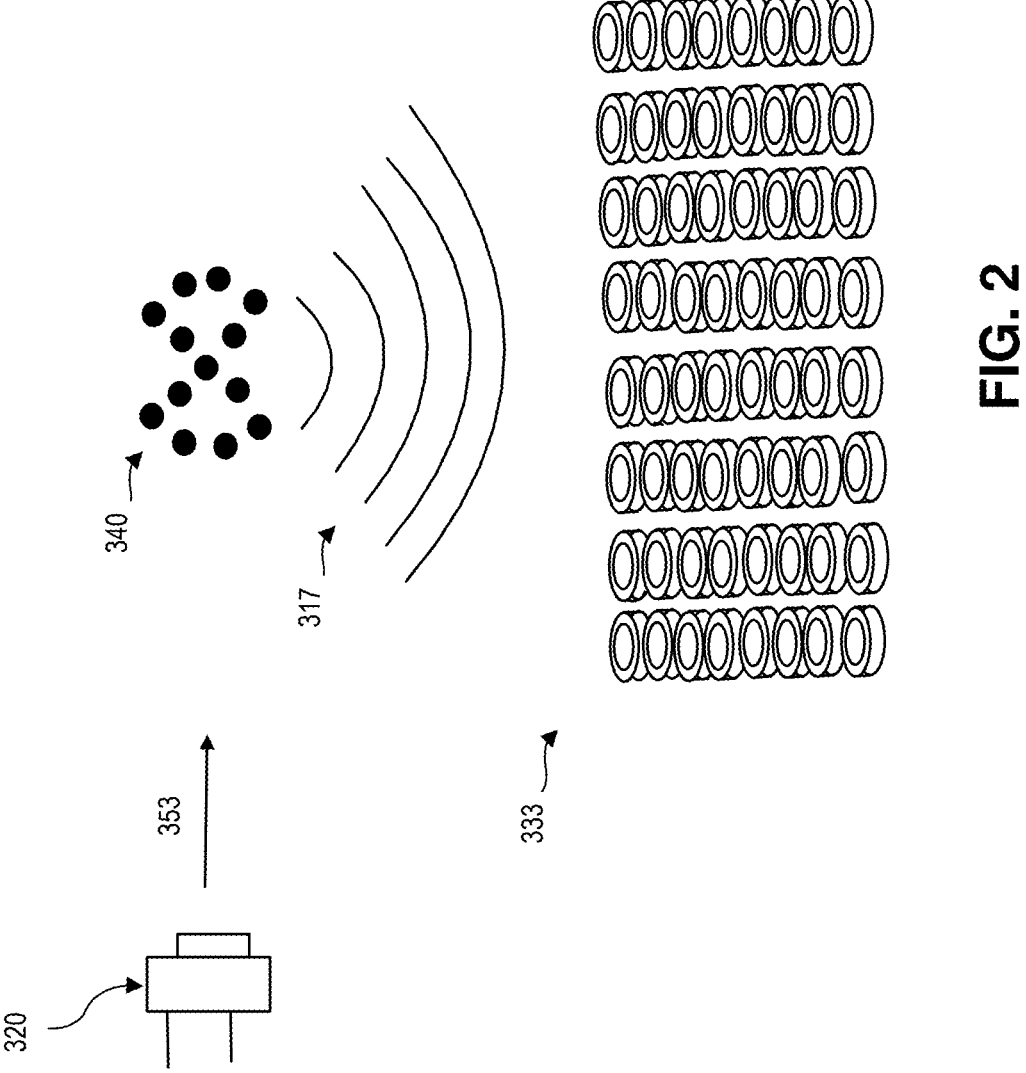
FIG. 2 illustrates an ultrasound array as it dynamically arranges micro-particles into a hologram, in accordance with aspects of the disclosure.

FIG. 2 illustrates an ultrasound array 333 and micro-particles 340 as they are dynamically arranged into a hologram, in accordance with aspects of the disclosure. Ultrasound array 333 uses energy of ultrasound signals 317 to rearrange micro-particles 340 into a hologram (e.g., 199 of FIG. 1) that is to be illuminated by a laser or light source 320. In various embodiments, light source 320 can provide laser projection through side illumination or bottom illumination, enabling various solid-state configurations of a laser. In embodiments, ultrasound array 333 may be similar or the same as ultrasound arrays 133A and 133B of FIG. 1. In embodiments, ultrasound array 333 rearranges a density of micro-particles 340 in a medium to control a reflection of illumination light 353, e.g., by controlling a reflective density of micro-particles 340, to create hologram 199. In aspects, ultrasound array 333 controls an acoustic density of ultrasound waves within a three-dimensional (3D) area where hologram 199 is to be formed.

In FIG. 1 (and FIG. 3, described below), micro-particles that are manipulated are included in air, e.g., dust particles, water droplets, aerosols, or other microscopic components. In aspects, the ultrasound signal may be between 40 KHZ and 200 kHz. In embodiments, the ultrasound array is configured to dynamically arrange the micro-particles within a range or 3-dimensional (3D) area of 2 cm to 2 meters from the head mounted display. In other embodiments, micro-particles 340 may be included in liquid, tissue, or other suitable holographic medium (e.g., FIG. 4) where ultrasound signals may manipulate micro-particles.

Figure 3:
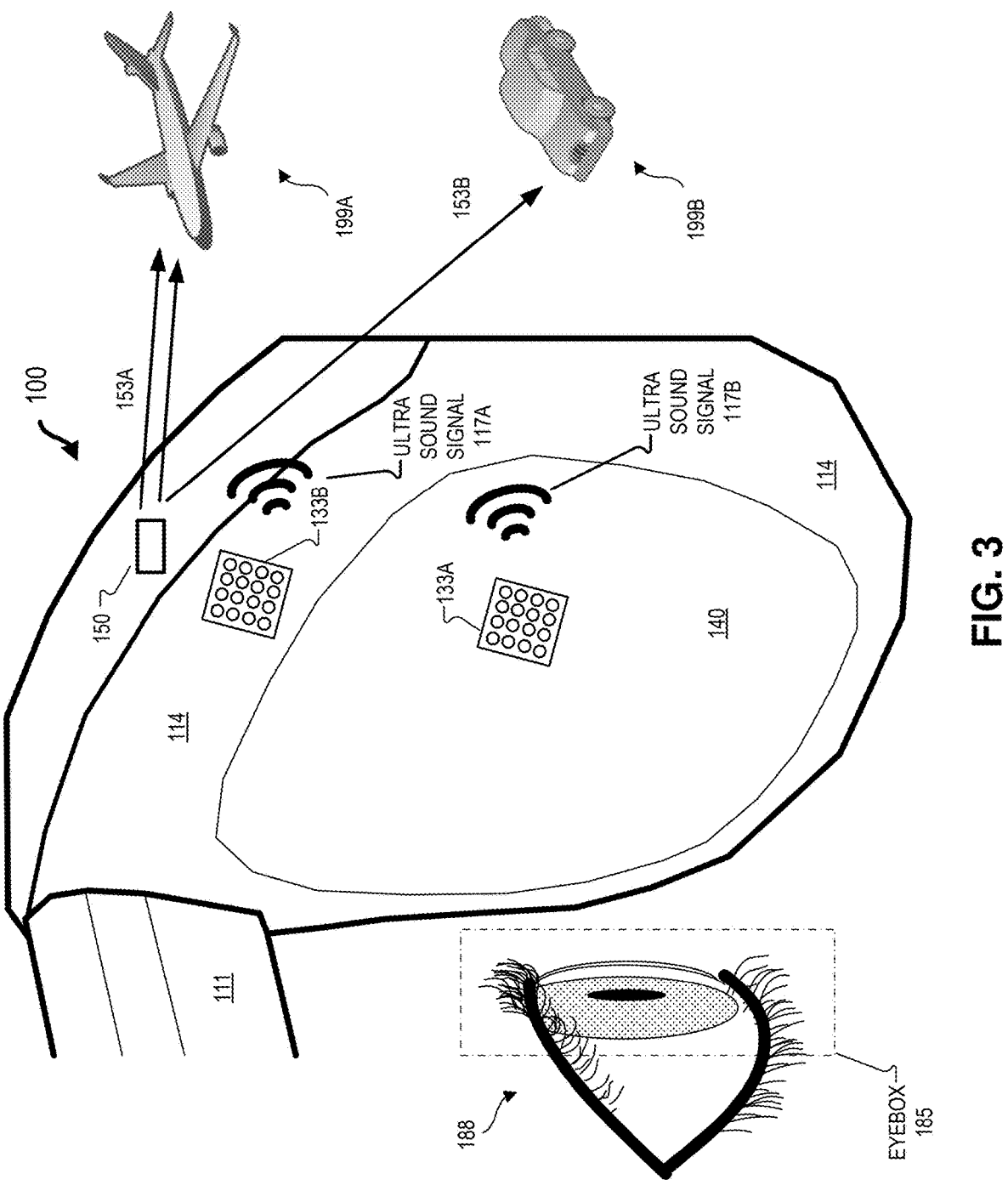
FIG. 3 illustrates an enlarged portion of the HMD of FIG. 1 in further detail, in accordance with aspects of the disclosure.

To further illustrate, FIG. 3 is an enlarged view of a portion of HMD 100 of FIG. 1, in accordance with aspects of the disclosure. In the embodiment, ultrasound arrays 133A and 133B are configured to emit respective ultrasound signals 117A and 117B to dynamically arrange micro-particles into a hologram including a respective image of an airplane and a car. The images are viewable by a user when the micro-particles are illuminated with illumination light (e.g., 153A and 153B) within a visible light wavelength band. Note that in other embodiments, hologram 199B may have its own light source. In aspects, the images included in hologram 199A or 199B are viewable by eye 188 from an eyebox region 185 but also by other viewers who are not wearing the HMD 100.

Note that in various embodiments, ultrasound arrays 133A and 133B may each transmit ultrasound signals for distinct images (as shown in FIG. 2) or, less typically but in some embodiments, jointly for a single image.

Any micro-particles that can be suitably manipulated by ultrasonic or acoustic energy are contemplated. As noted above, in some embodiments, such micro-particles may include dust particles, water droplets, and the like. Thus, in various embodiments, energy supplied by ultrasound array may vary for particular images, e.g., with varying humidity or air quality.

Figure 4:
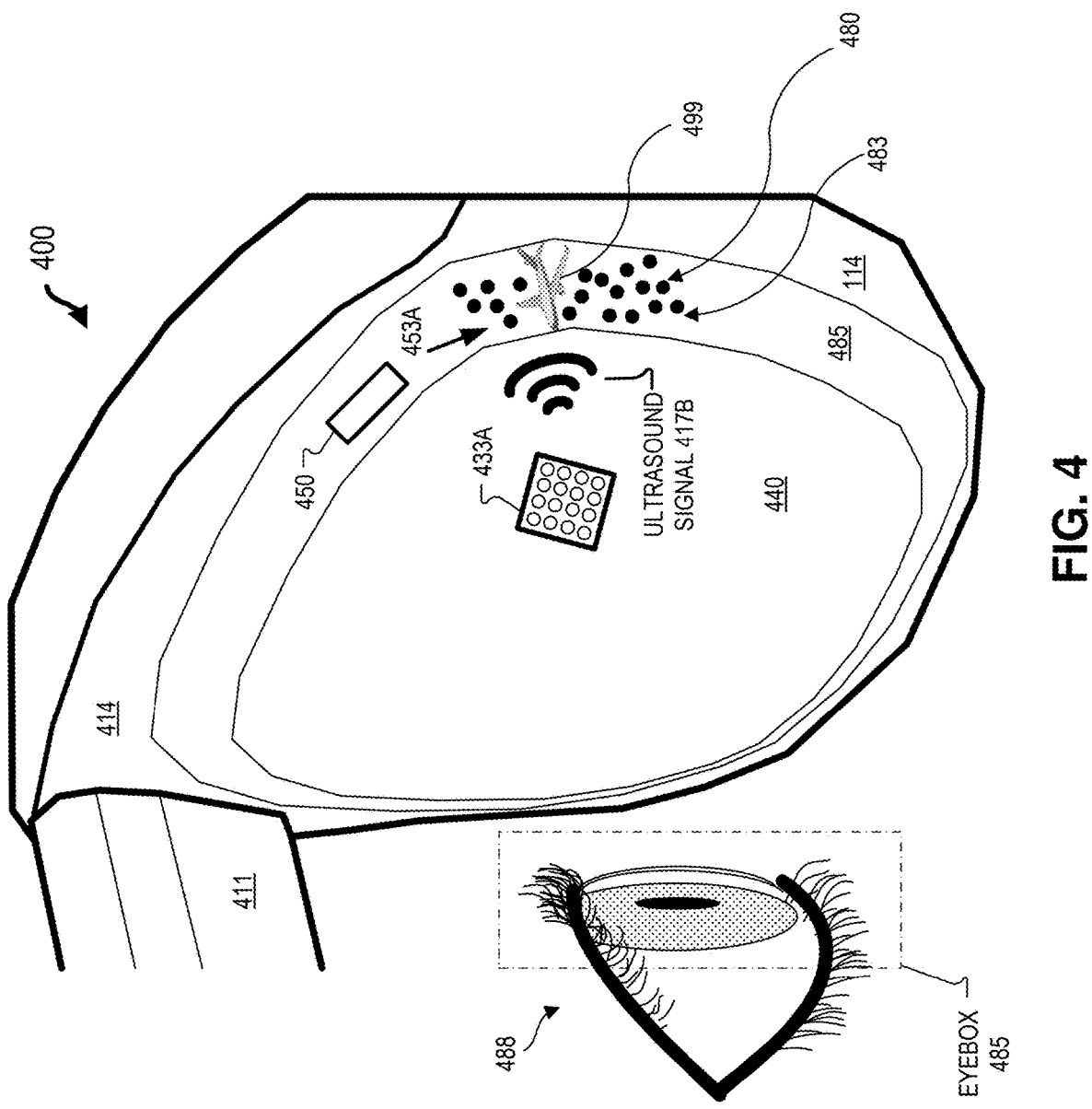
FIG. 4 illustrates an enlarged portion of another HMD including an ultrasound array, in accordance with aspects of the disclosure.

In various embodiments, the micro-particles may also be included in a holographic medium that is contained in AR glasses. For example, as shown in FIG. 4, ultrasound array 433A may dynamically arrange micro-particles 480 included in a holographic medium 483 in an augmented reality (AR) glass system HMD 400. In various embodiments, micro-particles 480 may be included in a layer 485 of holographic medium 483 (e.g., fluid or polymer) in a lens element or lens 440. In some aspects, the holographic medium may include liquid and include microbeads which are dynamically arranged or rearranged into a hologram by ultrasound signals 417B. In embodiments, hologram 499 including an image is viewable by an eye 488 from an eyebox region 485 when light source 450 shines illumination light 453A onto the dynamically arranged micro-particles 480.

Note that the embodiment shown in lens 440 including layer 485 is merely an example. Any suitable configuration of a holographic medium included or proximate to lens 440 coupled to frame 414 and arms 411 such that ultrasound array 433A can dynamically arrange the micro-particles, is contemplated. For example, an entire layer included in lens 440 may include the holographic medium or only a portion of it, as shown in FIG. 4. In various embodiments, light source 450 may be disposed in other locations (below, behind, etc.,) relative to the holographic medium in order to provide illumination light 453A.

Note that in various other embodiments (not shown), micro-particles are dynamically arranged via an ultrasound array wholly separate from a head mounted display. In some embodiments, the ultrasound array is located on a substrate configured to transmit ultrasound signals for viewing by multiple parties independent from a location of the head mounted display.

Figure 5:
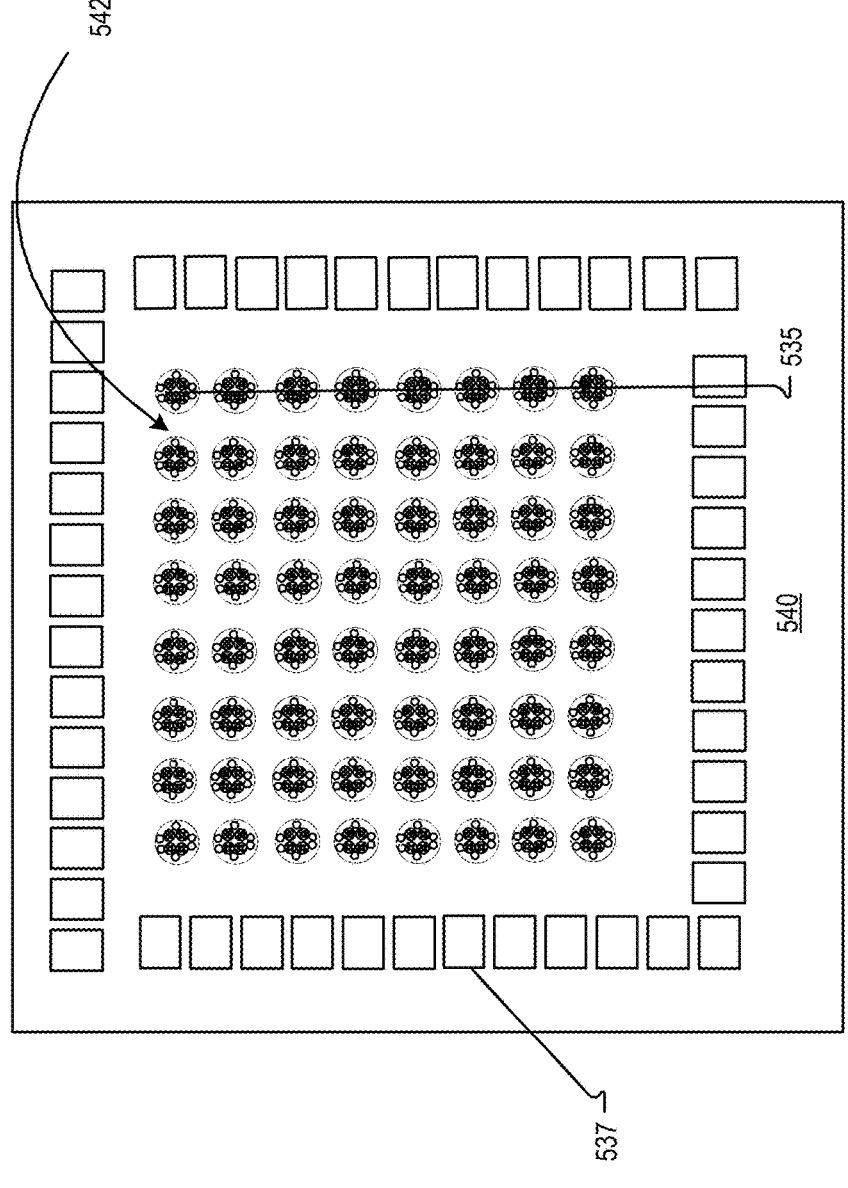
FIG. 5 illustrates individual ultrasonic transducers arranged in a phased array for use on a transparent surface, in accordance with aspects of the disclosure.

FIG. 5 illustrates individual ultrasonic transducers 535 arranged in a phased array 542 disposed on an example lens 540. In embodiments, each ultrasonic transducer 535 may be driven by electrical signals provided to contacts 537. In some embodiments, transparent conductors (e.g., indium tin oxide) or small copper traces may connect contacts 537 to individual ultrasonic transducers 535 so that each ultrasonic transducer 535 can be driven individually to effect beam-steering of ultrasound signals (e.g., 117, 317, 417 of previous FIGS. 1, 2, 4). In aspects, lens 540 may include a transparent substrate and phased array 542 may include transparent Piezoelectric Micromachined Ultrasonic Transducers (PMUT). In some embodiments, phased array ultrasound array 542 includes fifty or more transparent PMUTs. In implementations, transparent ultrasonic transducers 535 generate ultrasound signals for acoustic levitation and thus the dynamic arrangement of micro-particles for hologram generation.

Figure 6:
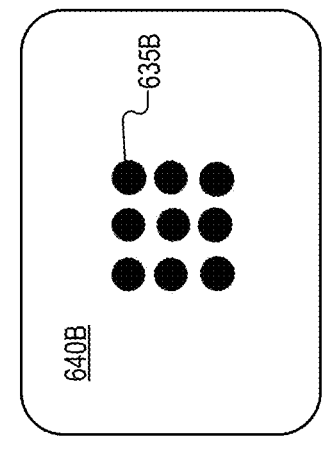
FIG. 6 illustrates various example layout configurations of ultrasonic transducers on example lenses, in accordance with aspects of the disclosure.
Figure 6:
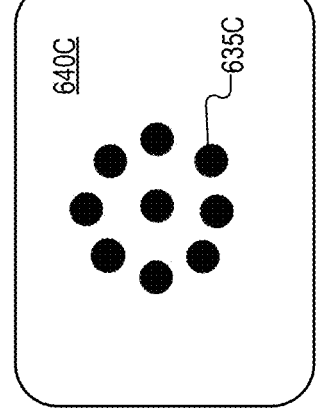
Figure 6:
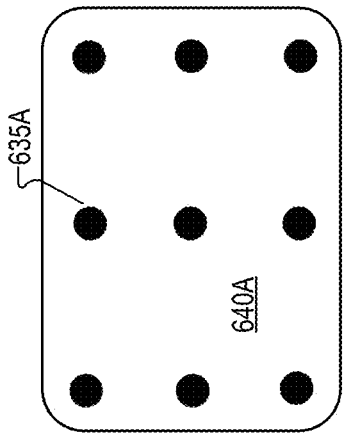

FIG. 6 illustrates various layout configurations of transparent ultrasonic transducers 635A, 635B, 635C in respective lenses 640A, 640B, and 640C. Note that for clarity in FIG. 6., only one of a plurality of each of transparent ultrasonic transducers 635A, 635B, 635C is labeled. As shown, lens 640A illustrates an example distributed array of transparent ultrasonic transducers 635A, lens 640B illustrates an example phased array of transparent ultrasonic transducers 635B, and lens 640C illustrates any other suitable example array, e.g., circular array of transparent ultrasonic transducers 635C. Note that ultrasound arrays of FIGS. 1-5 may be examples of phased arrays, similar to that of lens 640B. In aspects, the phased array steers a plurality of ultrasound beams by delaying ultrasound signals relative to each other to create acoustic pressure to levitate the micro-particles.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display comprising:
an ultrasound array configured to emit ultrasound signals to dynamically arrange micro-particles into a hologram that includes an image when the micro-particles are illuminated with illumination light within a wavelength band, wherein the ultrasound array is disposed in a lens element of the head mounted display; and

a light source configured to illuminate the dynamically arranged micro-particles with the illumination light within the wavelength band so that the image included in the hologram is viewable from an eyebox region of the head mounted display.

2. The head mounted display of claim 1, wherein the micro-particles are included in air, liquid, or tissue.

3. The head mounted display of claim 1, wherein ultrasound array is a phased array ultrasound array that includes transparent Piezoelectric Micromachined Ultrasonic Transducers (PMUT).

4. The head mounted display of claim 3, wherein the phased array ultrasound array includes fifty or more transparent PMUTs.

5. The head mounted display of claim 1, wherein the ultrasound signal is between 40 KHZ and 200 kHz.

6. The head mounted display of claim 1, wherein the ultrasound array is configured to dynamically arrange the micro-particles within a range of 2 cm to 2 meters from the head mounted display to vary a reflective density of the micro-particles.

7. The head mounted display of claim 1, wherein the wavelength band is visible light.

8. A method comprising:
dynamically arranging micro-particles into a hologram that includes an image, wherein dynamically arranging the micro-particles into the hologram includes manipulating an orientation or position of the micro-particles using ultrasound signals from an ultrasound array, and manipulating the orientation or position of the micro-particles includes manipulating micro-particles within a holographic medium included in a layer in a lens of a head mounted device; and
illuminating the dynamically arranged micro-particles with illumination light within a wavelength band to make the image of the hologram viewable by an eye.

9. The method of claim 8, wherein the micro-particles include microbeads included in a holographic medium.

10. The method of claim 8, wherein manipulating the orientation or position of the micro-particles includes sending ultrasonic signals from transparent Piezoelectric Micromachined Ultrasonic Transducers (PMUT).

11. The method of claim 10 wherein manipulating the orientation or position of the micro-particles with ultrasound signals includes controlling an acoustic density of ultrasound waves within a three-dimensional (3D) area to form the hologram.

12. The method of claim 8, wherein manipulating the orientation or position of the micro-particles includes manipulating micro-particles within a 3D area that is 2 cm to 2 meters away from a head mounted display.

13. The method of claim 8, wherein illuminating the dynamically arranged micro-particles with illumination light within a wavelength band comprises generating light from a laser within a visible light band.

14. The method of claim 10, wherein the ultrasound array includes a transparent phased array ultrasound array to form a plurality of beams having different directions relative to each other to dynamically arrange the micro-particles.

15. A non-transitory machine-accessible storage medium that provides instructions that, when executed by a machine, will cause the machine to perform operations comprising:
causing an ultrasound array to transmit signals to dynamically arrange micro-particles into a hologram that includes an image, wherein to dynamically arrange the micro-particles into the hologram includes manipulating an orientation or position of the micro-particles using ultrasound signals from an ultrasound array;

causing a light source to illuminate the dynamically arranged micro-particles with illumination light within a wavelength band to make the image of the hologram viewable by an eye; and adjusting an intensity of the light source according to a distance of the hologram from a head mounted device (HMD).

16. The non-transitory machine-accessible storage medium of claim 15, wherein operations to cause the ultrasound array to transmit signals include sending instructions to a controller for a plurality of transparent MEMs ultrasonic transducers to control a relative phase between outputs of a plurality of ultrasound transducers.

17. The non-transitory machine-accessible storage medium of claim 15, further providing instructions that, when executed by the machine, will cause the machine to perform further operations, comprising receiving image information to be converted to ultrasound band information for dynamic arrangement of the micro-particles.

*   *   *   *   *